United States Patent Office 3,740,267
Patented June 19, 1973

3,740,267
METHOD OF CLEANING APPARATUS USED IN PROCESSING POLYETHYLENE TEREPHTHALATE
John Christopher Haylock, Richmond, Va., assignor to Allied Chemical Corporation, New York, N.Y.
No Drawing. Filed Sept. 22, 1971, Ser. No. 182,901
Int. Cl. B08b 9/00; C23g 5/02
U.S. Cl. 134—10                          8 Claims

ABSTRACT OF THE DISCLOSURE

Method of removing unwanted residues of polyethylene terephthalate from apparatus used in processing polyethylene terephthalate which involves washing the apparatus with a cleaning solvent comprising triethanolamine at a temperature of 150°–260° C. to form a solution of substantially all of the polyethylene terephthalate remaining in the apparatus. The cleaning process can be accelerated by the addition of a minor proportion of alkali metal hydroxide to the solvent.

BACKGROUND OF THE INVENTION

The present invention relates to an improved process for removing unwanted residues of polyethylene terephthalate and related metallic catalysts from apparatus which has been used in processing the polyethylene terephthalate.

The industrial applications of polyethylene terephthalate have become increasingly important during recent years with the consequent development of methods and apparatus for processing polyethylene terephthalate in larger and larger amounts. During the commercial processing of polyethylene terephthalate the problems associated with keeping the apparatus clean have been quite extensive. Several methods have been used from time to time in an effort to remove unwanted residues of polyethylene terephthalate from various parts of the apparatus employed in making, transferring, extruding, and otherwise processing polyethylene terephthalate.

Pipes and screens used in transmitting polyethylene terephthalate have been especially difficult to clean when they have become clogged or plugged. The cleaning has generally been accomplished by means of high boiling organic compounds which exert both solvent effects and melting effects upon the unwanted residues of polyethylene terephthalate. Unfortunately, such a technique requires high temperatures if it is to include any melting effect. Thus, for example, the use of hot triethylene glycol at elevated temperatures of say 280° C. as a cleaning compound is fraught with a serious fire hazard and the use of this solvent compound requires considerable safety precautions in order to prevent fires from causing serious damage. Other high boiling solvents can be used such as chlorinated aromatic compounds, triphenyl phosphate, and diethyl phthalate; however, the expense of such solvents and the precautions involved in their use leave much to be desired.

An alternative cleaning medium which is easier to handle than the high boiling organic solvent compounds is a solution of sodium hydroxide in a mixture of ethylene glycol and water. This alkaline solution is effective at relatively low temperatures such as 120° C. but it functions quite slowly so that the long period of time required makes it uneconomical.

Thermolytic methods for cleaning apparatus used in processing polyethylene terephthalate have recently been suggested. A typical procedure comprises internally contacting the apparatus with a gas heated at from about 325° to about 525° C. until the unwanted residues of polyethylene terephthalate have been vaporized. Unfortunately, this procedure is very time consuming and often causes carbonaceous degradation of the polyethylene terephthalate. Also, metallic catalysts are generally not vaporized. Therefore, thermolytic methods are not a complete solution to the basic problem of cleaning the apparatus, and additional costly cleaning steps, e.g., washing with hot aqueous alkali for an extended period of time, are required to obtain substantially cleaner equipment.

Although the above and other methods have been used in removing unwanted residues, research has continued in an effort to find a more economic method for cleaning apparatus used in processing polyethylene trephthalate.

SUMMARY OF THE INVENTION

In view of the foregoing, it is an object of the present invention to provide an improved method for cleaning apparatus used in processing polyethylene trephthalate.

It is a further object of the present invention to provide an economical method for dissolving polyethylene terephthalate residues from apparatus containing the same.

Another object is to provide a method for cleaning apparatus used in processing polyethylene terephthalate whereby fire hazards are substantially reduced.

Yet another object is to provide triethanolamine solutions of polyethylene terephthalate, which solutions show little or no tendency to form gels during processing or storage.

These and other objects and advantages which will be obvious hereinafter are achieved by the present invention which is set forth in the following description wherein parts and percentages are by weight.

According to the present invention, apparatus used in processing polyethylene terephthalate is cleaned to remove unwanted residues of polyethylene terephthalate by a method which comprises:

(a) Internally contacting said apparatus with triethanolamine heated at about 150°–260° C., preferably about 150°–200° C., until substantially all of the unwanted residues of polyethylene terephthalate are dissolved in the triethanolamine ;and (b) Removing the resulting solution from said apparatus.

The triethanolamine used in the instant method is commercially available. It has a very high boiling point, about 344° C. at atmospheric pressure; the open cup flash point is about 185° C. Its melting point is about 20° C., and it has no susceptibility to spontaneous heating.

In accordance with the invention, the triethanolamine solvent can be used without additives to dissolve polyethylene terephthalate residues at temperatures of about 150°–260° C., preferably 150–200° C. The lower temperatures are preferred because they mitigate the fire hazard. The residues which are dissolved may vary in extent of polymerization but are normally solid at temperatures utilized in the instant method. Some residues may be light brown or even darker in color.

Sufficient solvent is used so that substantially all of the residue in the apparatus is dissolved. The resulting solutions comprise triethanolamine having dissolved therein high molecular polyethylene terephthalate, said triethanolamine being in at least 1.5 times, preferably 5–20 times, the weight of the polyester. If desired, the residues can be dissolved at temperatures above 260° C.; however, about 260° C., the solvent begins to decompose. Generally, the polyethylene terephthalate residues can be dissolved within about two hours at say 200° C.

Although triethanolamine can be used alone to dissolve polyethylene terephthalate residues at temperatures of 150°–250° C., I have discovered that the dissolution of the polyester is significantly accelerated by the addition of a small proportion of an alkali metal hydroxide to the solvent. Preferably, about 0.25–1.0% of potassium or sodium hydroxide are added based on the weight of the triethanolamine. Typically, the polyethylene terephthalate residues can be dissolved in the preferred solvent within about 0.5 hour at say 200° C. Use of a large excess of alkali metal hydroxide in the solvent should be avoided because the polyester residue is thereby converted to the sodium salt of terephthalic acid which is insoluble in the solvent. Desirably, about one part of alkali metal hydroxide is used per 10–30 parts of polyester residue. With use of these proportions, the residue is normally completely dissolved from the apparatus within about 0.5 hour. Moreover, progress of the dissolution is easily followed by the rate of disappearance of the alkali metal hydroxide from the solvent.

Triethanolamine is not only a good solvent for the polyethylene terephthalate residues, but the product solutions containing the polyester can be readily processed and the triethanolamine can be recovered by simple methods. For example, the solvent can be distilled away from the polyester at reduced pressures. Alternatively, the triethanolamine solutions containing polyester can be reused in the instant process until the triethanolamine present in the solution is only about 1.5 times the weight of the polyester. Shaped structures, such as threads and the like, composed of polyethyelne terephthalate can be made from solutions of the polyester by conventional procedures such as extrusion into water. The polyester solutions in triethanolamine are relatively stable in that there is little or no tendency for gel formation during normal processing or storage.

DESCRIPTION OF THE PREFERRED EMBODIMENTS

In order to demonstrate the invention, the following examples are given:

EXAMPLE 1

A polyethylene terephthalate residue is obtained from an apparatus used in processing polyethylene terephthalate of the type described in U.S. Pat. 3,848,410 and obtained by reacting glycol and terephthalic acid to obtain the diglycol-ester intermediate and condensing the intermediate in the presence of a trivalent antimony salt of a higher aliphatic hydrocarbon monocarboxylic acid to prepare colorless, linear, high molecular weight polyethylene terephthalate which is spun to form fibers. The polyethylene terephthalate residue is a typical residue that colects in pipe lines and other portions of the apparatus during continuous operation for long periods of time. This residue is essentially highly degraded, brown polyester having a melting point above 260° C. The melting point of the pure polymer that is spun is about 254° C. as measured by Differential Thermal Analyses.

About 10 grams of the above-described highly degraded, brown polyester residue is added to 113 grams of triethanolamine, and the mixture is heated at 150°–200° for two hours. The bulk of the polymer is dissolved within the first hour of heating and the remainder is dissolved within the next hour. The solvent may be recovered from the polymer by distillation at reduced pressure, e.g., below about 150 mm. Hg.

EXAMPLE 2

The procedure of Example 1 is followed to clean a pipe line in a polyethylene terephthalate processing apparatus that is particularly plugged with highly degraded, brown polyethylene terephthalate residue. The remaining space in the pipe line is filled with triethanolamine, and the pipe line is externally heated at about 200° C. by means of a heat-transfer medium consisting of a eutectic mixture of diphenyl and diphenyl oxide. The pipe line is cleaned of all residue within about two hours.

The solvent containing dissolved polyethylene terephthalate may be stored at ambient temperatures and reused in subsequent cleaning of the apparatus. Eventually, it can be extruded into water to prepare a useful shaped article from the polyethylene terephthalate. The triethanolamine dissolves in the water and may be recovered by conventional distillation procedures. Recovery of the polyethylene terephthalate residues in the form of a useful shaped articles is particularly desirable for ecological reasons because it avoids burning the waste polyester, which is a common procedure.

EXAMPLE 3

The procedure of Example 1 is repeated except that 10 grams of highly degraded, brown polyethylene terephthalate residue is added to 113 grams of triethanolamine containing 0.5 gram of sodium hydroxide. When the mixture is heated at 150°–200° C., the residue dissolves within 0.5 hour. The same result is obtained when the 0.5 gram of sodium hydroxide is replaced with 0.5 gram of potassium hydroxide.

EXAMPLE 4

The procedure of Example 1 is repeated except that 15 grams of polyethylene terephthalate residue is added to 113 grams of triethanolamine containing about 5 grams of potassium hydroxide. The polymer does not dissolve in the solvent but is changed to a white insoluble powder. This powder is separated from the solvent. It is found that the powder dissolves in water, but a white solid is precipitated from the aqueous solution by acidification with dilute sulfuric acid. This evidence indicates that the white powder formed in the solvent is the potassium salt of terephthalate acid, and the structure is confirmed by infrared and ultraviolet analyses.

I claim:

1. A method of removing unwanted residues of polyethylene terephthalate from apparatus which has been used in processing polyethylene terephthalate, which comprises internally contacting said apparatus with triethanolamine heated at from about 150° C. to about 260° C. until substantially all of the unwanted residues of polyethylene terephthalate are dissolved in the triethanolamine, and removing the resulting solution from said apparatus.

2. The method as claimed in claim 1 wherein the triethanolamine is heated at from about 150° C. to about 200° C.

3. The method as claimed in claim 1 wherein the weight ratio of triethanolamine to residues of polyethylene terephthalate is between about 5 and about 20.

4. The method as claimed in claim 1 wherein the triethanolamine containing dissolved residues of polyethylene terephthalate is reused for removing unwanted residues of polyethylene terephthalate from apparatus which has been used in processing polyethylene terephthalate until the resulting solution contains up to 40% by weight of polyester.

5. The method as claimed in claim 4 wherein the triethanolamine containing dissolved residues of polyethylene terephthalate is extruded into water to form a shaped structure consisting essentially of polyethylene terephthalate, the triethanolamine being dissolved in the water.

6. A method of removing unwanted residues of polyethylene terephthalate from apparatus which has been used in processing polyethylene terephthalate, comprising internally contacting said apparatus with triethanolamine containing about 0.25 to 1.0%, based on the weight of triethanolamine, of an alkali metal hydroxide selected from the group consisting of sodium hydroxide and potassium hydroxide, and heated at from about 150° C. to about 260° C. until substantially all of the unwanted residues of polyethylene terephthalate are dissolved in the triethanolamine, and removing the resulting solution from said apparatus.

7. The method as claimed in claim 6 wherein the triethanolamine containing alkali metal hydroxide is heated at from about 150° C. to about 200° C.

8. The method as claimed in claim 6 wherein the weight ratio of triethanolamine to residues of polyethylene terephthalate is between about 5 and about 20.

References Cited

UNITED STATES PATENTS

| | | | |
|---|---|---|---|
| 2,700,005 | 1/1955 | Klingel | 134—22 C |
| 2,917,418 | 12/1959 | Cathcart | 134—22 R X |
| 3,468,849 | 9/1969 | Rothert | 134—22 X |
| 3,475,218 | 10/1969 | Torrenzano | 134—22 X |
| 3,619,295 | 11/1971 | Nishizaki | 134—22 R |
| 3,669,740 | 6/1972 | Yamamoto | 134—22 R |

OTHER REFERENCES

Chemical Abstracts, 59: p. 6569g (1963).
Chemical Abstracts, 70: 10699j (1969).
Chemical Absrtacts, 53: p. 768f (1959).
Chemical Abstracts, 57: p. 1075b (1962).

MORRIS O. WOLK, Primary Examiner

S. MARANTZ, Assistant Examiner

U.S. Cl. X.R.

134—22 R, 22 C, 42; 260—32.6 R

PO-1050
(5/69)

UNITED STATES PATENT OFFICE
CERTIFICATE OF CORRECTION

Patent No. 3,740,267        Dated June 19, 1973

Inventor(s) John C. Haylock

It is certified that error appears in the above-identified patent and that said Letters Patent are hereby corrected as shown below:

Column 2, line 12, "trephthalate" should be --terephthalate--.

Column 2, line 17, "trephthalate" should be --terephthalate--.

Column 2, line 71, "150°-250°C." should be --150°-260°C--.

Column 3, line 41, "3,848,410" should be --3,484,410--.

Column 3, line 48, "colects" should be --collects--.

Column 3, lines 56 and 57, "150°-200°" should be --150°-200°C.--.

Column 3, line 67, "particularly" should be --partially--.

Signed and sealed this 2nd day of April 1974.

(SEAL)
Attest:

EDWARD M. FLETCHER, JR.        C. MARSHALL DANN
Attesting Officer              Commissioner of Patents